July 22, 1969  K. PAULE ET AL  3,456,740

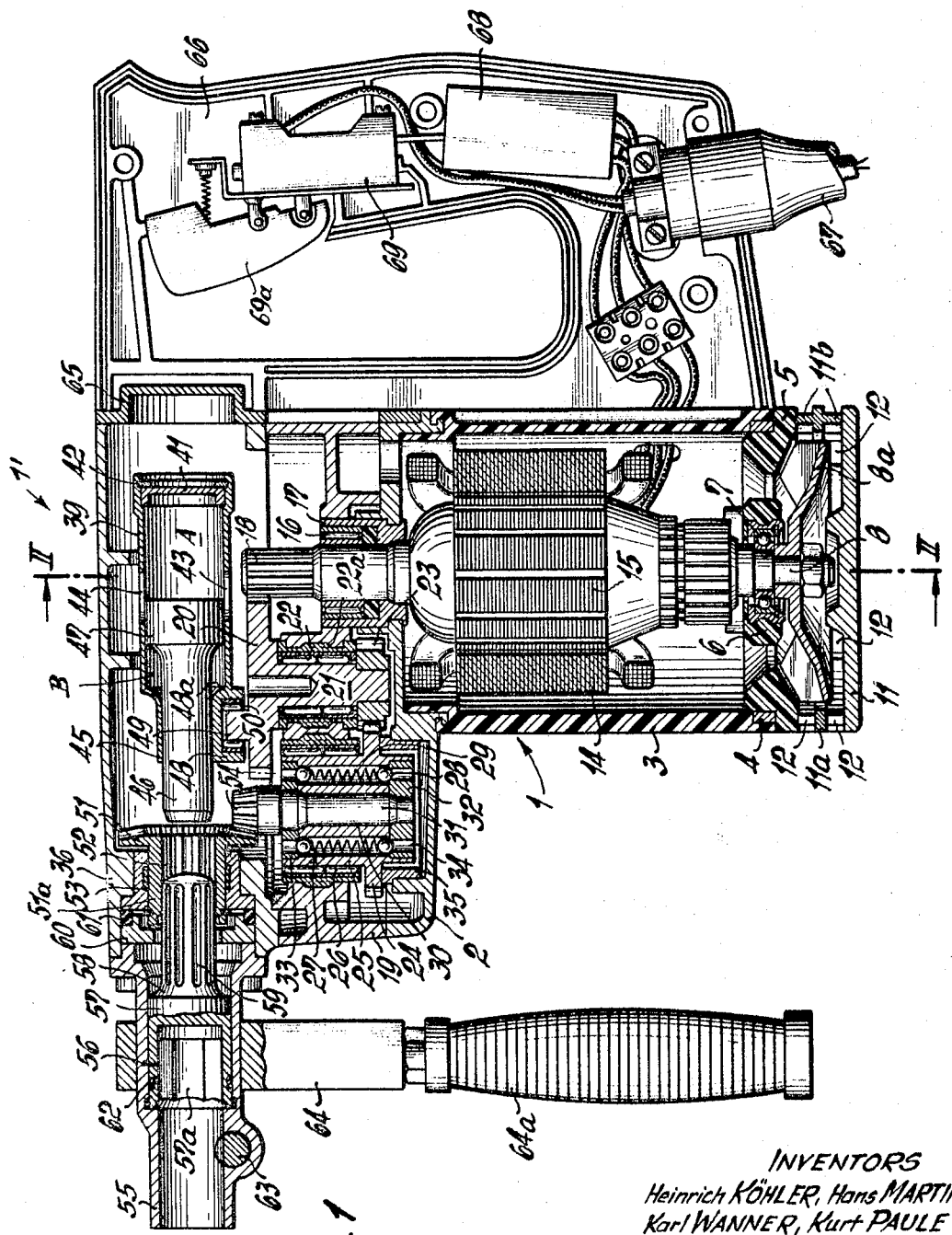

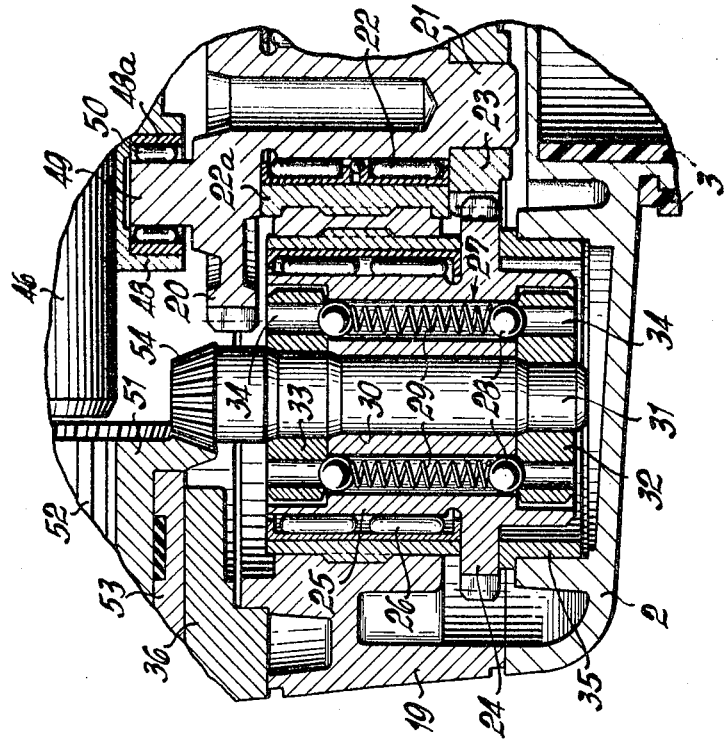
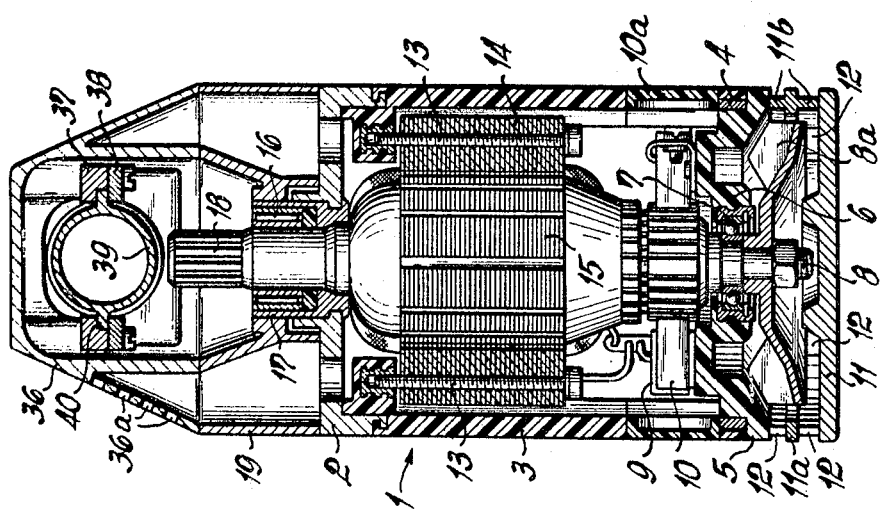

POWER TOOL

Filed Jan. 12, 1968  3 Sheets-Sheet 3

INVENTORS
Heinrich KÖHLER, Hans MARTIN
Karl WANNER, Kurt PAULE
Manfred BLEICHER, Helmut BRONNERT
BY their ATTORNEY

United States Patent Office

3,456,740
Patented July 22, 1969

3,456,740
POWER TOOL
Kurt Paule, Manfred Bleicher, and Hans Martin, Stuttgart, Karl Wanner, Echterdingen, and Helmut Bronnert, Stuttgart, Germany, and Heinrich Koehler, Camillus, N.Y., assignors to Robert Bosch, G.m.b.H., Stuttgart, Germany
Filed Jan. 12, 1968, Ser. No. 697,517
Claims priority, application Germany, Jan. 13, 1967, B 90,724
Int. Cl. E21c 3/04; B25d 11/04, 17/00
U.S. Cl. 173—109                                24 Claims

ABSTRACT OF THE DISCLOSURE

A portable power hammer wherein the barrel of the housing accommodates a cylinder receiving a piston between two air cushions. The cylinder is reciprocable by a slide-pin oscillator whose pin is caused to orbit about the axis of a gear in a transmission which is driven by an electric motor. The piston has a ram which can strike against an anvil provided on a tool holder receiving the rear end of a tool. The anvil is reciprocable in but cannot rotate with reference to an annular bevel gear which is driven by the gear of the transmission through the intermediary of an overload clutch.

Background of the invention

The present invention relates to power tools in general, and more particularly to improvements in power hammers, also called chipping hammers, which can be employed to drive a tool into and to rotate the tool with reference to a workpiece.

In presently known power hammers, the ram of the striker assembly is guided in a reciprocable cylinder which receives motion from a crank shaft through the intermediary of a connecting rod. Such motion transmitting devices occupy too much space in the housing of the power tool.

Summary of the invention

It is an object of our invention to provide a power tool wherein a reciprocable striker assembly comprises a ram which can transmit impacts to a tool holder and wherein the drive for the striker assembly occupies less room than in conventional power tools.

Another object of the invention is to provide a novel and improved motion transmitting connection between one element of the striker assembly and the motor of the power tool.

A further object of the invention is to provide a power tool which can transmit impacts to and which can also rotate a material removing or material penetrating tool and wherein the transmission of torque to the tool is terminated automatically when the tool offers excessive resistance to rotation, such as could cause breakage of the tool, damage to the workpiece and/or injury to the operator.

An additional object of the invention is to provide a novel overload clutch between the prime mover and the tool supporting part or parts of the above outlined power tool.

An ancillary object of the invention is to provide a novel cooling arrangement for the moving parts of a portable power hammer.

A concomitant object of the invention is to provide a novel transmission for use in the power hammer.

Still another object of our invention is to provide a portable power hammer which produces a negligible shock when the aforementioned clutch terminates the driving connection between the prime mover and the tool holder.

A further object of the invention is to provide a portable power hammer which is simpler and particularly lighter than presently known power hammers.

One feature of our invention resides in the provision of a power tool, particularly a portable power hammer wherein a barrel of the housing accommodates a rotary and axially movable tool holder for a drilling, boring or like tool and wherein the striker assembly includes a cylinder member reciprocably mounted in the housing, a piston member reciprocably mounted in the cylinder member between two cushions of air which cause the piston member to reciprocate with and permit movements of the piston member relative to the cylinder member, a prime mover including a motor and a transmission having a rotary output portion, and a so-called slide-pin oscillator which converts rotary movements of the output portion into reciprocatory movements of one of the two members of the striker assembly. The other member of this assembly can strike against an anvil of the tool holder to thereby drive the working end of the tool into the material of a workpiece.

In accordance with another feature of our invention, the tool holder is reciprocable in but cannot rotate with reference to a hollow rotary element which is installed in the barrel of the housing in front of the striker assembly so that the one member of such assembly can enter the hollow element to strike against the anvil of the tool holder. The driving connection between the output portion of the transmission and the hollow element comprises an overload clutch which terminates the transmission of torque to the rotary element when the tool offers excessive resistance to rotation. The clutch preferably comprises balls which are reciprocable in bores of a first clutch element driven by the output portion and may penetrate partially into bores or recesses of a second clutch element which can drive the rotary element. When the resistance of the tool to further rotation reaches a predetermined value, the balls are expelled from the recesses of the second clutch element and permit the first clutch element to rotate with reference to the second clutch element.

The novel features which are considered as characteristic of the invention are set forth in particular in the appended claims. The improved power tool itself, however, both as to its construction and its mode of operation, together with additional features and advantages thereof, will be best understood upon perusal of the following detailed description of a specific embodiment with reference to the accompanying drawing.

Brief description of the drawing

FIG. 1 is an axial sectional view of a portable power tool which embodies our invention;

FIG. 2 is a transverse sectional view as seen in the direction of arrows from the line II—II of FIG. 1;

FIG. 3 is a larger-scale view of a detail in the structure shown in FIG. 1; and

Description of the preferred embodiment

Figure 4:
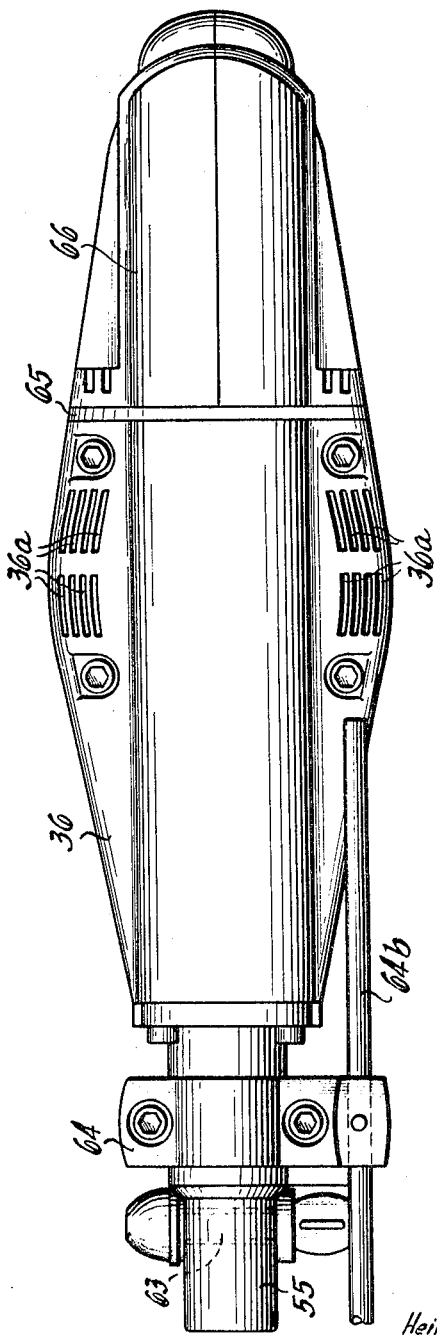
FIG. 4 is a top plan view of the power tool.

The power tool of our invention comprises a housing 1 having a metallic barrel 1' and a plastic envelope or shell 3 surrounding a skeleton frame 4 which extends downwardly from the rear or right-hand portion of the barrel, as viewed in FIG. 1. The lower end portion of the envelope 3 accommodates a plastic ring 5 having a diametrically extending portion or bridge 6 (FIG. 2) which supports an antifriction bearing 7 for the lower end of an armature shaft 8 which forms part of an electric motor, the latter forming part of a prime mover for the movable parts of the power tool. The bearing 7 is adjacent to the collector side of the motor. The ring 5 further supports holders 9 for carbon brushes 10 and its bridge 6 serves to guide cooling air. The envelope 3 has openings located above the carbon brushes and closed by plastic inserts 10a. A rotary suction fan 8a is mounted on the shaft 8 at a level below the bearing 7; this fan is provided with rearwardly bent blades to reduce noise and to improve the efficiency of the cooling system. A metallic cover 11 which closes the housing 1 below the fan 8a is secured to spacers or distancing elements 11b provided on a metallic sleeve 11a which is affixed to the underside of the ring 5. The distancing elements 11b provide slots 12 for escape of spent coolant tangentially of the envelope 3. The parts 3, 4, 5, 11a and 11 together form a casing for the motor of the prime mover. The motor further comprises a package of laminations 14 which are fastened in the housing 1 by screws 13. These laminations are accommodated in the plastic shell 3 of the housing 1 and surround an armature 15 which rotates with the shaft 8 and whose upper end portion is journalled in a needle bearing 16 received in a bush 17 which is rigid with a flange l forming the lower part of the barrel 1'. The parts 8, 16, 17 extend into a portion 19 of the barrel 1', and this portion 19 constitutes a gear case accommodating a transmission of the prime mover. The transmission includes an input member 18 formed by a pinion at the upper end of the shaft 8. The gear case 19 has twin walls (see FIG. 2) to form an inner part which accommodates the transmission and an outer part or jacket. The space between the jacket and the inner part conveys air which is being drawn by the fan 8a. The pinion 18 meshes with a gear 20 which constitutes an output member of the transmission and has an integral shaft 21 rotatable in two needle bearings 22 surrounded by a bush 22a. The latter is mounted in the gear case 19. The lower end of the shaft 21 carries a gear 23 (see particularly FIG. 3) which meshes with a gear 24 forming part of a first clutch element which further includes an elongated hub 25 whose diameter is only slightly smaller than the pitch circle of the gear 24. The hub 25 is surrounded by a twin needle bearing 26 mounted in the gear case 19 and is provided with six equidistant axially parallel bores 27 each accommodating two torque transmitting parts 28 here shown as balls which are movable lengthwise and are biased apart by helical expansion springs 29. The hub 25 is further provided with an axial passage 30 which accommodates a shaft 31 carrying two additional clutch elements 32, 33 here shown as disks which are press-fitted thereon and are disposed at the opposite ends of the bores 27. The disks 32, 33 can rotate with the shaft 31 in the passage 30 of the hub 25 and each of these disks has six axially parallel equidistant bores or recesses 34. The recesses 34 of the disk 32 are coaxial with the recesses 34 of the disk 33, and each of these recesses can be placed into axial alignment with one of the bores 27 in the hub 25. However, the diameters of the recesses 34 are slightly smaller than those of the bores 27 so that they can receive only portions of the balls 28 when the angular position of the hub 25 with reference to the shaft 31 is such that each bore 27 registers with two recesses 34. The springs 29 then cause the balls 28 to transmit torque from the gear 24 and hub 25 to the disks 32, 33 and hence to the shaft 31. When the shaft 31 encounters a predetermined resistance to rotation, the springs 29 yield and permit the hub 25 to rotate with reference to the disks 32, 33. Thus, the just described parts 25–34 form a rather simple overload clutch or safety clutch which can transmit a predetermined torque but is disengaged automatically if the resistance encountered by shaft 31 to rotation with the gear 24 exceeds the bias of the springs 29. The lower end face of the gear 24 rotates on a supporting ring 35 which is press-fit in the adjoining portion of the flange 2.

The top section 36 of the barrel 1' is located at a level above the gear case 19 (see FIGS. 1 and 2) and serves to accommodate an impeller or striker assembly of the power tool. A portion of the top section 36 is formed with twin walls and its outer wall has inlet openings 36a which admit cool atmospheric air in response to rotation of the fan 8a. Such air then flows between the walls of the section 36 to cool the striker assembly. The interior of the section 36 accommodates two laterally spaced elongated upper rails 37 affixed to lower rails 38 and forming therewith two guide grooves or channels for laterally extending guide ribs or projections 40 provided on a reciprocable cylinder 39 which forms one main component of the striker assembly. The rails 37 and/or 38 can form integral parts of the section 36 and the ribs 40 preferably form integral parts of the cylinder 39 which latter is preferably a metallic casting. The rear end portion of the cylinder 39 accommodates around cover or cap 41 which is held against rearward movement by a split ring 42 recessed into the internal surface of the cylinder. The cap 41 is received in an enlarged rear end portion of the cylinder 39, and the latter's internal surface is machined to a high degree of finish to receive, with little friction, a piston or plunger 47 constituting the second main component of the striker assembly. The median portion of the cylinder 39 has upper and lower slits, slots or analogous apertures 44, 43 which allow the chamber A or B in the cylinder to communicate with the interior of the barrel 1' and hence with the atmosphere.

The forward end portion of the cylinder 39 forms a cylindrical neck 45 which guides a piston rod or ram 46 of the piston 47. The piston 47 seals the chambers A and B from each other and its ram 46 can strike against a tool or against a tool holder in a manner to be presently described. The means for reciprocating the cylinder 39 with reference to the rails 37, 38 comprises a so-called slide-pin oscillator best shown in FIGS. 1 and 3 and including a slide 48 rigid with the neck 45 and extending transversely of the cylinder in front of the piston 47, and a pin 49 which is eccentrically supported by the gear 20, i.e., by the output member of the transmission in the gear case 19. The groove of the slide 48 accommodates the outer race 48a of a needle bearing 50 which surrounds the pin 49. The just described slide-pin oscillator replaces conventional connecting rods and its important advantage is that its parts occupy very little room so that the housing 1 is much shorter and hence handier than the housings of presently known power tools.

A hollow rotary element including an annular bevel gear 51 is mounted in the barrel 1' in front of the neck 45 on the cylinder 39 and meshes with a bevel gear 54 at the upper end of the shaft 31. In addition to the bevel gear 51, the aforementioned rotary element comprises a hollow cylindrical hub 51a which is rotatable in the barrel 1' and whose central passage 52 is large enough to receive the ram 46 of the piston 47 when the latter performs a forward stroke. The surface surrounding the passage 52 is formed with involute internal teeth which mesh with involute teeth 59 on an extension or anvil 58 of a tool holder or nozzle 57. The anvil 58 is movable lengthwise of the hub 51a. The root diameter of teeth 59 on the anvil 58 exceeds the diameter of the ram 46 on the piston 47. The hub 51a is journalled in a bearing sleeve 53 which is mounted in the top section 36 of the barrel 1'. The mating bevel gear 54 preferably forms an integral part of the shaft 31 and this gear 54 is driven when the aforementioned clutch 25–34 is capable of transmitting torque from the gear 24 to the shaft 31. The foremost portion 55 of the barrel 1' is detachable from the section 36 and forms a socket which is coaxial with the bevel gear 51. This socket 55 is preferably a one-piece cylindrical casting having a bore with a smaller-diameter front portion and a larger-diameter rear portion 56; the rear portion 56 of this bore accommodates the front part of the tool holder 57 which is reciprocable in the socket 55.

A shock absorbing ring 60 is inserted between the bearing sleeve 53 and a flange at the rear end of the socket 55 to intercept the tool holder 57 when the latter rebounds after reaching the forward end of the bore 56. The ring 60 is adjacent to an elastic ring 61 which is located in front of the bearing sleeve 53, and it will be seen that the ring 60 extends radially inwardly and into the path of a shoulder at the front end of the anvil 58. The sleeve 53 transmits the thus weakened impacts to the section 36 of the barrel 1'. The holder 57 is formed with a circumferential groove for a gasket 62 which is slidable in the bore 56 of the socket 55 to prevent entry of dust or other foreign matter when the power tool is in use, for example, to drill a hole in a masonry wall with attendant generation of dust. The holder 57 has a front recess 57a of hexagonal or other non-circular outline to receive the stem of a tool, not shown. Such stem can be held in the recess 57a against axial movement by a locking bolt 63 which has a flat and is rotatable in the socket 55. The stem is provided with two flanges one of which can move rearwardly and beyond the bolt 63 when the latter's flat faces upwardly as shown in FIG. 1.

The socket 55 is surrounded by a clamping member 64 which carries a downwardly extending auxiliary handle 64a. The clamping member 64 can be turned with reference to the socket 55 to be thereupon fixed in selected angular position which is best suited to properly engage the auxiliary handle 64a in the course of a boring, drilling or other operation. Nuts and bolts on the upper end of the clamping member 64 can be loosened by resorting to a simple tool in order to permit angular displacement of the auxiliary handle. The clamping member 64 is provided with an eye for a depth measuring rod 64b which can be introduced into a drill hole to determine its depth. The rod 64b is displaceable with reference to the clamping member 64 but normally retains its position by friction.

The rear end of the barrel 1' carries a cover member 65 which is concealed by the shells of a two-piece main handle 66 extending all the way to the ring 5. A cable 67 connects the motor in the envelope 3 with a source of electrical energy, and this cable extends into the lower portion of the main handle 66 as shown in the lower right hand portion of FIG. 1. The handle 66 further accommodates a capacitor 68 and a start-stop switch 69 having a trigger 69a. This handle 66 resembles the handgrip portion of a spade, and its axis is substantially parallel with the axis of the shaft 8.

In order to start the motor, the user depresses the trigger 69a to close the switch 69, whereby the armature 15 rotates with the shaft 8 and the latter drives the gear 20 by way of the pinion 18. The gear 23 on the shaft 21 of the gear 20 drives the gear 24 and the latter drives the shaft 31 unless the latter offers a resistance which overcomes the bias of springs 29 so that the balls 28 are caused to leave the recesses 34 of the clutch elements 32, 33. The bevel gear 54 on the shaft 31 drives the bevel gear 51 and the latter rotates the tool holder 57 through the intermediary of teeth in the hub 51a and teeth 59 on the anvil 58 of the tool holder. The latter rotates a tool when the hexagonal rear end portion of the tool extends into the recess 57a.

The pin 49 on the gear 20 reciprocates the cylinder 39 by way of the slide 48. The cushions of air in chambers A, B form two motion transmitting means which cause the piston 47 to share reciprocatory movements of the cylinder 39 whereby the ram 46 strikes repeatedly against the rear end of the anvil 58. The apertures 43, 44 in the cylinder 39 connect the one or the other of chambers A, B with the atmosphere. The cushion in the chamber A (in front of the cap 41) accelerates the piston 47 to move forwardly when the cylinder performs a forward stroke. The cushion in the chamber B behind the neck 45 is weaker and its function is to cause the piston 47 to move rearwardly toward the cap 41 when the cylinder performs a return stroke. These cushions insure that the ram 46 strikes against the anvil 58 with equal force during each forward stroke of the piston 47. The operation of the ram 46 is particularly satisfactory due to absence of the aforementioned connecting rod which is a standard part of conventional power tools.

The shaft 8 drives the fan 8a so that the latter draws air through the inlet openings 36a in the outer wall of the section 36. The currents of air flow along the inner walls of the section 36, thereupon between the walls of the gear case 19, and finally through the interior of the envelope 3 to exchange heat with parts of the motor and to escape through the slots 12. Thus, the currents of air cool the striker assembly, the transmission and the motor.

If the recess 57a accommodates the stem of a boring or drilling tool, and if the working end of the tool happens to jam in the drill hole, the teeth 59 of the anvil 58 cause the shaft 31 to offer excessive resistance to rotation so that the clutch 25–34 is disengaged in the aforedescribed manner. The gear 24 continues to rotate the hub 25 whereby the balls 28 return into the bores 27 and allow the hub 25 to rotate with reference to the disks 32, 33. The sound developing on such expulsion of portions of balls 28 from the recesses 34 is readily detected by the operator who knows that the motor should be arrested, i.e., that the user should release the trigger 69a. If the user continues to maintain the switch 69 in closed position, the noise ceases and the hub 25 simply continues to rotate with reference to the disks 32, 33. Such rotation produces little friction so that the torque which the retracted balls 28 attempt to transmit to the disks 32, 33 is rather small This is of advantage because the handle 64a and/or 66 is not forcibly withdrawn from the user's hands when the overload clutch is disengaged owing to excessive resistance to rotation of the shaft 31. There is a rather weak shock when the balls 28 are expelled from the recesses 34 but the tool is thereupon quiet again and proper retention of the housing 1 by hand requires the application of a relatively small force.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a power tool, a combination comprising a housing; a cylinder member reciprocably received in said housing; a piston member reciprocably received in said cylinder member; a prime mover having an output portion; a crank-slide oscillator connecting said output portion with one of said members to reciprocate the same; and elastic motion transmitting means provided in said cylinder member to reciprocate said other member in response to reciprocation of said one member, said other member having a ram arranged to transmit impacts to a tool in said housing in response to reciprocation of said other member by way of said motion transmitting means.

2. A combination as defined in claim 1, wherein said cylinder member has at least one integral external projection extending into a groove provided in said housing to guide said cylinder member during reciprocation with reference to the housing.

3. A combination as defined in claim 1, wherein said prime mover further comprises a motor having a shaft arranged to drive said output portion, and a fan mounted on said shaft and arranged to draw currents of air through said housing and along said cylinder member.

4. A combination as defined in claim 1, wherein said output portion is a gear and said prime mover further comprises a motor having a rotary shaft and a pinion rigid with said shaft and meshing with said gear.

5. A combination as defined in claim 1, wherein said oscillator comprises a slide provided on and extending transversely of said one member and a pin extending into a groove of said slide and arranged to orbit about the axis of said output portion.

6. A combination as defined in claim 5, further comprising an antifriction bearing having a race rotatable on said pin and extending into said groove.

7. A combination as defined in claim 1, wherein said elastic motion transmitting means comprises at least one air cushion in a chamber of said cylinder member at one end of said piston member.

8. A combination as defined in claim 7, wherein said cylinder member comprises a tubular portion surrounding said chamber and having an open end, a round cover in said open end, and a split ring recessed into said open end to hold said cover against movement in response to the pressure of said cushion.

9. A combination as defined in claim 1, wherein said prime mover further comprises a motor having a shaft arranged to drive said output portion and extending substantially at right angles to said cylinder member.

10. A combination as defined in claim 9, wherein said output portion is a gear rotatably mounted in said housing and said oscillator comprises a slide extending transversely of and secured to said one member and a pin eccentrically mounted on said gear and extending into a groove of said slide.

11. A combination as defined in claim 1, wherein said prime mover further comprises a motor having a shaft arranged to rotate said output portion and extending substantially at right angles to said members, and a handle attached to said housing rearwardly of and extending in substantial parallelism with said shaft.

12. A combination as defined in claim 11, wherein said handle resembles the handgrip portion of a spade.

13. A combination as defined in claim 1, wherein said other member is said piston member and wherein said ram is a piston rod rigid with said piston member and extending forwardly from and beyond said cylinder member.

14. A combination as defined in claim 13, wherein said cylinder member has a cylindrical neck portion slidably surrounding a portion of said piston rod.

15. A combination as defined in claim 14, wherein said oscillator comprises a slide rigid with and extending transversely of said one member in the region of said neck portion.

16. A combination as defined in claim 1, wherein said housing comprises a portion which accommodates said cylinder member and further comprising a hollow rotary element journalled in said housing portion in front of said cylinder member and arranged to transmit torque to a tool in said housing, a tool holder having an anvil axially movably received in said hollow element in the striking range of said other member and coupled for rotation with said element, and a driving connection between said prime mover and said hollow element.

17. A combination as defined in claim 16, wherein said hollow element is coaxial with said members and comprises a first bevel gear in mesh with a second bevel gear forming part of said driving connection.

18. A combination as defined in claim 16, wherein said output portion is a gear and wherein said oscillator comprises a pin eccentrically mounted on said gear, said driving connection receiving motion from said gear and including an overload clutch which disengages said hollow element from said gear when said hollow element offers a predetermined maximum resistance to rotation.

19. A combination as defined in claim 18, wherein said clutch comprises a first rotary clutch element driven by said gear, a second rotary clutch element coaxial with said first clutch element and drivingly connected with said hollow element, said clutch elements having axially parallel bores and the bore of one clutch element being of smaller diameter than the bore of the other clutch element but having its center located at substantially the same distance from the common axis of said clutch elements, a torque transmitting part reciprocable in the bore of said other clutch elements and means for biasing said part into the bore of said one clutch element with a force which is overcome when said hollow element offers said predetermined resistance to rotation.

20. A combination as defined in claim 19, wherein said driving connection further comprises a second gear which is rigid with and extends radially beyond said other clutch element and receives torque from said first mentioned gear.

21. A combination as defined in claim 20, wherein said first mentioned gear comprises a shaft and said driving connection further comprises a third gear mounted on said last mentioned shaft and meshing with said second gear.

22. A combination as defined in claim 19, wherein said clutch further comprises a third clutch element rigid with said one clutch element and having a bore in registry with the bore of said one clutch element, said other clutch element being disposed between said one clutch element and said third clutch element, and a second torque transmitting part in the bore of said other clutch element, said biasing means being disposed between said parts to bias the latter toward the bores of said one and said third clutch element.

23. A combination as defined in claim 22, wherein said driving connection further comprises a shaft rigid with said one and said third clutch element and arranged to drive said hollow element.

24. A combination as defined in claim 23, wherein said shaft is inclined with reference to said hollow element and the latter comprises a first bevel gear, said driving connection further comprising a second bevel gear rigid with said shaft and meshing with said first bevel gear.

References Cited

UNITED STATES PATENTS

| | | | |
|---|---|---|---|
| 2,283,292 | 5/1942 | Smith | 173—118 X |
| 2,333,419 | 11/1943 | Fitch | 173—118 X |
| 2,447,886 | 8/1948 | Worth | 173—117 |
| 3,203,490 | 8/1965 | McCarty et al. | 173—117 X |
| 3,334,693 | 8/1967 | Badcock | 173—109 |

FOREIGN PATENTS

| | | |
|---|---|---|
| 1,946 | 2/1910 | Great Britain. Ad. 1909 |

DAVID H. BROWN, Primary Examiner

U.S. Cl. X.R.

173—118, 121, 133